UNITED STATES PATENT OFFICE.

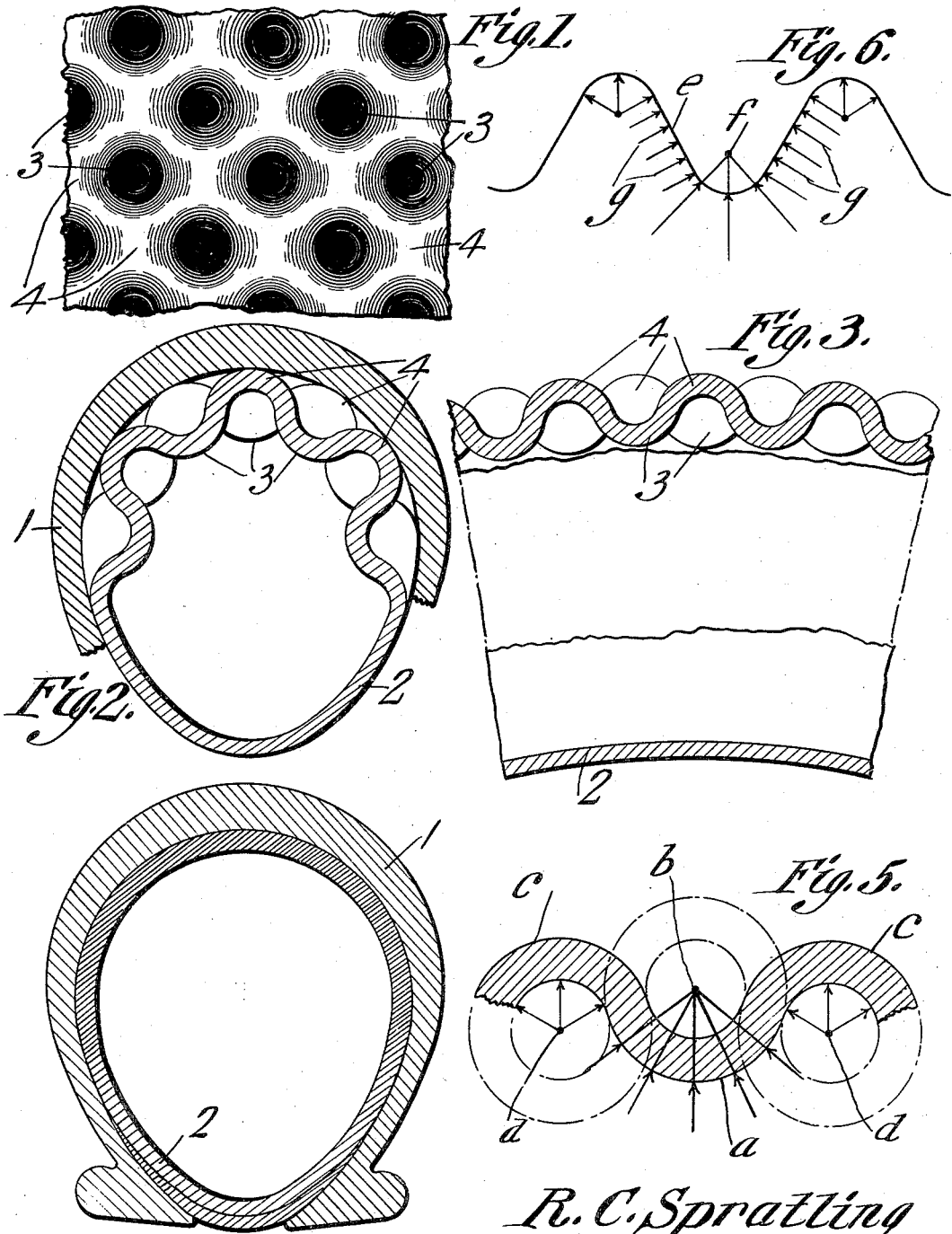

ROPER C. SPRATLING, OF OPELIKA, ALABAMA, ASSIGNOR TO OPELIKA PNEUMATIC TUBE COMPANY, A CORPORATION.

INNER TUBE FOR PNEUMATIC TIRES.

1,192,238.          Specification of Letters Patent.     Patented July 25, 1916.

Application filed May 26, 1916, Serial No. 100,061. Substituted for application Serial No. 84,374, filed March 15, 1916.

*To all whom it may concern:*

Be it known that I, ROPER C. SPRATLING, a citizen of the United States, residing at Opelika, in the county of Lee and State of Alabama, have invented a new and useful Inner Tube for Pneumatic Tires, of which the following is a specification.

This invention relates to inner tubes for pneumatic tires, one of its objects being to provide an inner tube made solely of soft rubber, which is free of all angles, and which, when inflated against the inner surface of a tire casing, will act to densify the material of which the tube is made so that, should the tube be punctured, the puncture will be automatically sealed and loss of air prevented.

A further object is to provide an inner tube utilizing inwardly extending hollow nodes all portions of the walls of which are extended along continuous curved lines merging into those portions of the tube between the nodes whereby pressure within the tube is distributed equally over all portions of the inner surface of the tube to insure uniform compression of the nodes.

A further object is to provide an inner tube the nodes of which are so arranged that the connections therebetween will constitute sinuous ribs for engagement with the tire casing prior to inflation and which ribs coöperate with the inner surface of the casing to prevent the tube from creeping.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of part of the tread portion of the inner tube. Fig. 2 is a transverse section through the tube and a portion of the casing, prior to inflation. Fig. 3 is a longitudinal section through a portion of the tube prior to inflation. Fig. 4 is a transverse section showing the tube inflated within the casing. Fig. 5 is an enlarged section through a portion of the tube and illustrating in diagram the action of air under pressure. Fig. 6 is a similar view showing the action of air under pressure upon a different form of node.

Referring to the figures by characters of reference 1 designates an ordinary tire casing adapted to receive the inner tube 2. This tube is formed of soft rubber and the tread portion is relatively thick and has inwardly extending hollow nodes 3 preferably arranged in staggered relation. Those portions of the tube between the nodes constitute approximately semi-spherical connections between the nodes as shown at 4 and coöperate to produce sinuous ribs upon the tread portion of the tube. The walls of the nodes and connecting portions are extended along continuous curved lines so that should a section be cut through the centers of two or more nodes the walls of said nodes and connecting portions would define ogee curves having their reverse arcs equal. This construction is advantageous for the reason that, as indicated in Fig. 5, when the tube is inflated for the purpose of packing it against the inner surface of the tire casing and thus densifying the wall of the tube, the lines of pressure against each node will converge to a point at the center of the recess in the node. For example, the lines of pressure against node *a* in Fig. 5 will converge to the center *b* of the node, while the lines of pressure against the connecting portion *c* of the tube will diverge from the center *d* of the recess behind said portion. Thus the action will be similar to that of a distended elastic ball contracting during the escape of air, although in the present instance the contraction is due to compression instead of inherent elasticity. Should the internal air pressure in an inflated ball be removed at one point the ball would immediately collapse at that point. So, too, in the present structure should the pressure upon one part of the wall of the node be greater than at other points, the node would collapse. To insure the equal distribution of pressure and thus avoid the collapsing of the node, and to obtain uniform densifying of the wall of the tube, it has been found by actual tests that the nodes must be approximately semi-spherical and the connecting portions therebetween must likewise be approximately semi-spherical. Thus the lines of force will be distributed as heretofore described and as shown in Fig. 5 with the result that the walls of the tube will become of uniform density along the tread portion and will act to automatically seal a puncture at any point therein. Thus the structure is much more efficient than one which, for example, has any portions of the walls of its nodes extended along straight lines. In such a structure, as has been illustrated in Fig. 6, and wherein the straight walls of the nodes have been indicated at $e$ the lines of force at the inner end of each node would converge toward the center $f$ of the recess directly back of the node but where the walls are straight the lines of force would be parallel as at $g$ and a greater pressure would thus be exerted on these straight portions of the nodes than at the rounded portions. Consequently the nodes would tend to collapse and a densifying of the material constituting the nodes would occur only to a small extent, if at all, and then only at certain points.

An inner tube such as constitutes the present invention has been found to be very efficient and avoids all of the objections heretofore encountered in inner tubes designed to automatically seal punctures.

What is claimed is:—

An inner tube for pneumatic tires formed of soft rubber and having a relatively thick tread portion provided with inwardly extending hollow, approximately semi-spherical nodes, those portions of the tread of the tube between the nodes constituting approximately semi-spherical connections between the nodes and coöperating to produce sinuous intersecting ribs upon the tread portion of the tube, the walls of the nodes and connecting portions being extended along continuous curved lines to form, in cross section, ogee curves having their reverse arcs equal.

In testimony that I claim the foregoing as my own, I have hereto affixed my signature in the presence of two witnesses.

ROPER C. SPRATLING.

Witnesses:
 HERBERT D. LAWSON,
 H. A. LONGSHORE.